US007836791B2

(12) United States Patent
Koyasu

(10) Patent No.: US 7,836,791 B2
(45) Date of Patent: Nov. 23, 2010

(54) KNOB ATTACHED TO DISTAL END OF LEVER

(75) Inventor: Ryo Koyasu, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 1022 days.

(21) Appl. No.: 11/633,523

(22) Filed: Dec. 5, 2006

(65) Prior Publication Data

US 2007/0151406 A1 Jul. 5, 2007

(30) Foreign Application Priority Data

Dec. 19, 2005 (JP) .......................... P2005-365166

(51) Int. Cl.
*G05G 1/10* (2006.01)
*H01H 9/00* (2006.01)
*F16H 63/42* (2006.01)

(52) U.S. Cl. ...................... 74/553; 116/28.1; 200/61.54

(58) Field of Classification Search .................. 74/553; 200/61.54; 116/28.1; 403/230; *H01H 25/04*
See application file for complete search history.

(56) References Cited

U.S. PATENT DOCUMENTS 4,991,535 A * 2/1991 Kobayashi et al. ......... 116/28.1
5,670,765 A * 9/1997 Yokoyama et al. ....... 200/61.54
5,780,794 A * 7/1998 Uchiyama et al. ........ 200/61.54
5,973,276 A * 10/1999 Koyasu .................. 200/61.54

FOREIGN PATENT DOCUMENTS

JP 10 269 899 * 10/1998
JP 2004-281263 10/2004

* cited by examiner

*Primary Examiner*—Vinh T. Luong
(74) *Attorney, Agent, or Firm*—Finnegan, Henderson, Farabow, Garrett & Dunner, L.L.P.

(57) ABSTRACT

A knob is attached to a distal end of a lever and has an approximately cylindrical knob body, a cap attached to a distal end of the knob body, and a metal-plated operating member attached to a side face of the knob body. The knob body has a pair of guiding protrusions that define a slit extending in an axial direction of the lever. The operating member includes a rib formed integrally therewith and a flange coupled to the rib approximately perpendicularly thereto. The flange is wider in width than the slit and engages the guiding protrusions due to insertion of the rib into the slit according to insertion of the operating member into the knob body in the axial direction.

4 Claims, 4 Drawing Sheets

KNOB ATTACHED TO DISTAL END OF LEVER

BACKGROUND OF THE INVENTION

1. Field of the Invention

The present invention relates to a knob attached to a distal end of a lever, such as a combination switch.

2. Related Background Art

Conventionally, an approximately cylindrical resin knob is provided at a distal end of a combination switch (for example, Japanese Patent Application Laid-open No. 2004-281263). Generally, the combination switch includes a lever body, a distal knob provided at a distal of the lever body, a center knob adjacent to the distal knob, and an inner knob adjacent to the center knob.

In recent years, for visibility improvement (namely, operability improvement) of a rotating operation unit of the combination switch, a metal-plated operating member is attached to a distal knob. Specifically, as shown in FIGS. 1A and 1B, a knob 100 includes an approximately cylindrical knob body 110 having a large opening 111 and a small opening 112 provided on both sides in an axial direction of a lever, a cap 120 attached to the small opening 112 of the knob body 110, and a metal-plated operating member 130 attached to a side face of the knob body 110.

The knob body 110 includes protrusions 114 that define an engagement slit 113 engageable with the operating member 130 and a pair of barbed portions 115 that engage the cap 120. The cap 120 includes an insertion hole 121 into which a distal end of the operating member 130 is inserted and a pair of through holes 122 that are opened on a flexible member and engaged with the barbed portions 115 respectively. The operating member 130 includes a pair of flexible snap tabs 131 that are integrally formed with the operating member 130 and barbed portions 132 provided on edges of the snap tabs 131 for engagement with the engagement slit 113.

SUMMARY OF THE INVENTION

In the knob 100, at an operating or assembling time of the combination switch, stress is concentrated on a fitting portion (particularly, on a pair of the flexible snap tabs 131) between the knob body 110 and the operating member 130. When the stress is concentrated on the fitting portion between the knob body 110 and the operating member 130, the operating member 130 may crack, or a metal plating film of the operating member 130 may be peeled off.

Accordingly, an object of the present invention is to provide a knob where cracking of an operating member or peeling off of a metal plating film thereon can be prevented.

The knob according to the present invention includes an approximately cylindrical knob body having a large opening and a small opening provided on both sides in an axial direction of a lever (not illustrated) or the knob, a cap attached to the small opening, and a metal-plated operating member attached to a side face of the knob body. The knob body has a pair of guiding protrusions that define a slit in the axial direction. The operating member includes a rib integrally formed therewith and a flange coupled to an edge of the rib approximately perpendicularly to the rib. The flange is wider in width than the slit and is caused to engage the guiding protrusions according to insertion of the rib into the slit caused by inserting the operating member into the knob body in the axial direction.

Since the knob body includes the guiding protrusions that define the slit, and the operating member includes the rib that is inserted into the slit and the flange that engages the guiding protrusions, chattering (vibration) that occurs at a fitting portion between the knob body and the operating member can be prevented, so that cracking of the operating member or peeling off of the metal plate film thereon can be prevented.

It is also possible that metal plating is directly performed to a part of the knob body before the metal-plated operating member is attached to the knob body in order to prevent cracking of the operating member or peeling off of the metal plating film thereon. If such a process is employed, however, the cost increases due to necessity for a masking work. On the other hand, according to the knob of the present invention, the cost due to necessity for the masking work can be eliminated, and cracking of the operating member or peeling off of the plating film thereon can be prevented.

It is preferable that the cap is attached to the knob body after the operating member is inserted into the knob body so that the operating member inserted into the knob body is fixed by attaching the cap.

It is preferable that the knob body has a barbed portion that engages the cap and the cap has a through hole that is engaged with the barbed portion. Since the knob body has the barbed portion that engages the cap and the cap has the through hole that engages the barbed portion, the cap is attached to the knob body after the operating member is inserted into the knob body, so that the operating member is securely fixed by the cap.

It is preferable that the operating member further includes a tab that abuts on an inner wall of the knob body and a joining rib that joins the flange and the tab, and the knob body further has a pair of restricting protrusions that define a short slit whose length in the axial direction is shorter than that of the slit. The joining rib and a portion defining an end of the short slit abut against each other to restrict the axial position of the operating member. Since the operating member further includes the tab and the joining rib, and the knob body further has the pair of the restricting protrusions that define a short slit, chattering (vibration) that occurs at a coupling portion of the knob body and the operating member when the knob is rotationally operated can be eliminated.

It is preferable that the cap further has a stepped portion that abuts on an end of the tab on the side of the cap. The end on the side of the cap and the stepped portion abut against each other to fix the operating member. Since the cap further has the stepped portion that abuts on the end of the tab on the side of the cap, and the end on side of the cap and the stepped portion abut against each other, the operating member can be securely fixed, so that chattering (vibration) of the operating member can be securely eliminated.

DESCRIPTION OF THE PREFERRED EMBODIMENT

Figure 1A:
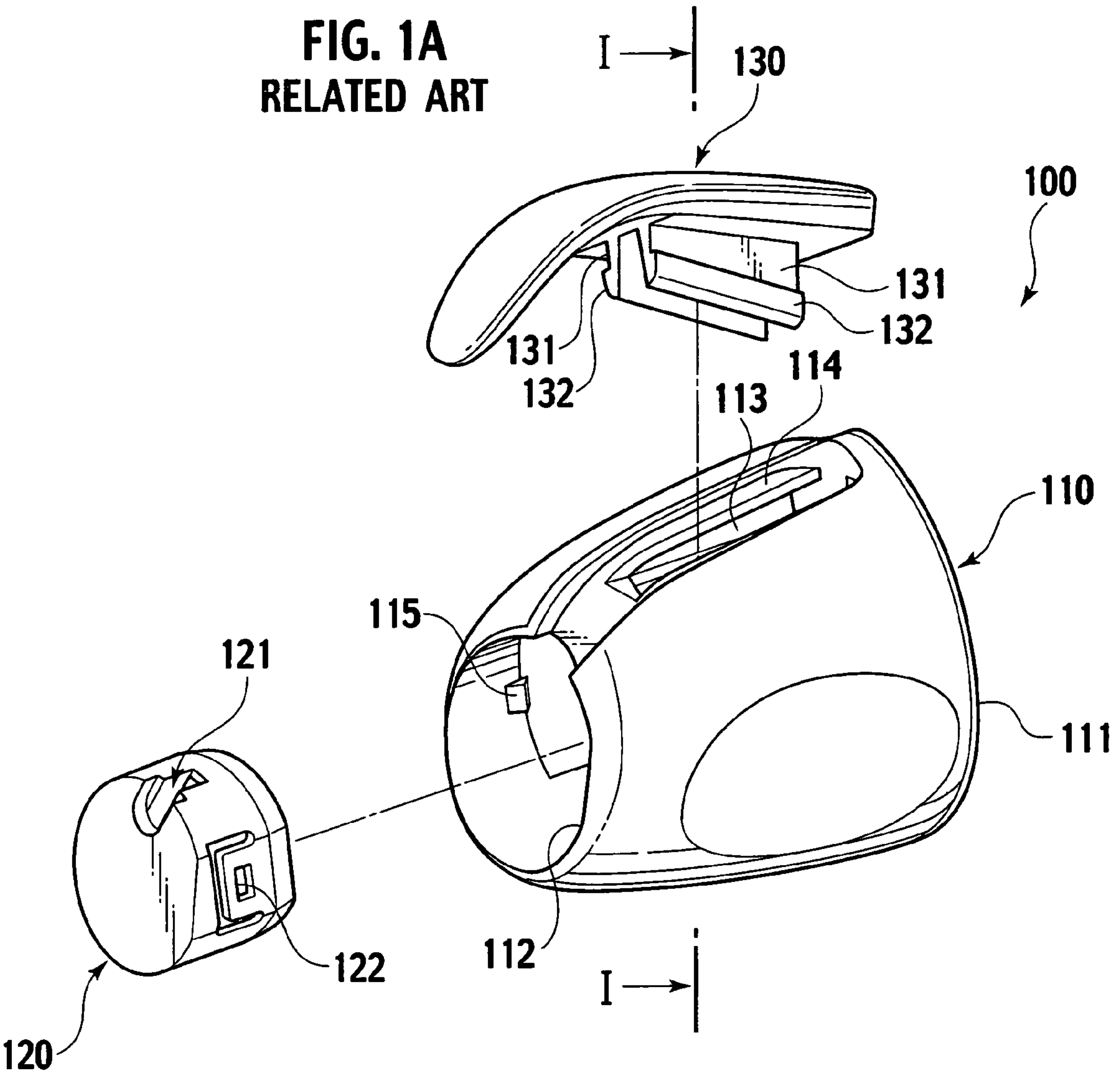
FIG. 1A RELATED ART
FIG. 1A is an exploded perspective view of a conventional knob.

Embodiments of a knob according to the present invention will be explained below with reference to the accompanying drawings. Note that the drawings are only schematic, and the ratio or the like of each dimension in the drawings can be different from those of actual products. Therefore, specific dimensions or the like should be assessed by the following explanations. In addition, parts which are different in relation or ratio in dimensions among respective diagrams are included in the embodiments.

As shown in FIG. 2 to FIG. 6, a knob 1 includes an approximately cylindrical knob body 10 having a large opening 11 and a small opening 12 provided on both sides in an axial direction, a cap 20 attached to the small opening 12 of the knob body 10, and a metal-plated operating member 30 attached to a side face of the knob body 10.

The knob body 10 is to be attached to, for example, a distal end of a combination switch, and it is made from resin (for example, ABS resin). The knob body 10 has a pair of guiding protrusions 14 that define a slit 13 into which the operating member 30 can be inserted in an axial direction. Each guiding protrusion 14 has an inclined portion 14*a* whose portion is inclined toward the large opening 11 in order to improve fixation (fitting degree) with the operating member 30.

The knob body 10 has a pair of barbed portions 15 that engage the cap 20. The knob body 10 includes a pair of restricting protrusions 17 that define a short slit 16 (see FIG. 4) whose length in the axial direction is shorter than that of the slit 13. A portion defining an end of the short slit 16 is caused to about on a joining rib 34 (described later) provided to the operating member 30, so that a position of the operating member 30 in an insertion direction thereof is restricted. The restricting protrusions 17 is clamped between a flange 32 and a tab 33 (described later) provided to the operating member 30, so that a position of the operating member 30 in a vertical direction (a direction perpendicular to the insertion direction) is restricted.

The cap 20 is attached to the knob body 10 after the operating member 30 is inserted into the knob body 10, so that the operating member 30 is fixed. The cap 20 includes a head 20A and a body 20B.

The cap 20 has a pair of through holes 21 that are engaged with the barbed portions 15 respectively. The cap 20 is formed with an accommodating portion 22 that accommodates a distal end T of the operating member 30 and the tab 33 described later. The accommodating portion 22 has the same width (shape) as that of the distal end portion T of the operating member 30 at the head 20A, and it has the same width (notch) as that of the tab 33 at the body 20B.

The cap 20 includes a stepped portion 23 (see FIG. 4) that abuts on an end 33*a* of the tab 33 on an insertion side of the cap 20. That is, the stepped portion 23 is formed due to a difference in diameter (step) between the head 20A and the body 20B and a difference in width therebetween. The stepped portion 23 and the end 33*a* are caused to abut against each other, so that the operating member 30 is fixed to the knob body 10 by the cap 20.

The operating member 30 is attached to the side face of the knob body 10, as described above, and it is metal-plated (for example, chrome and nickel plating). The operating member 30 includes a rib 31 that can be inserted into the slit 13 and a flange 32 that engages the guiding protrusions 14. The rib 31 is formed integrally with the operating member 30. The flange 32 is provided at an edge (namely, on the side of a knob central axis) of the rib 31, and it has a taper 32*a* (see FIG. 3) for facilitating insertion.

Figure 3:
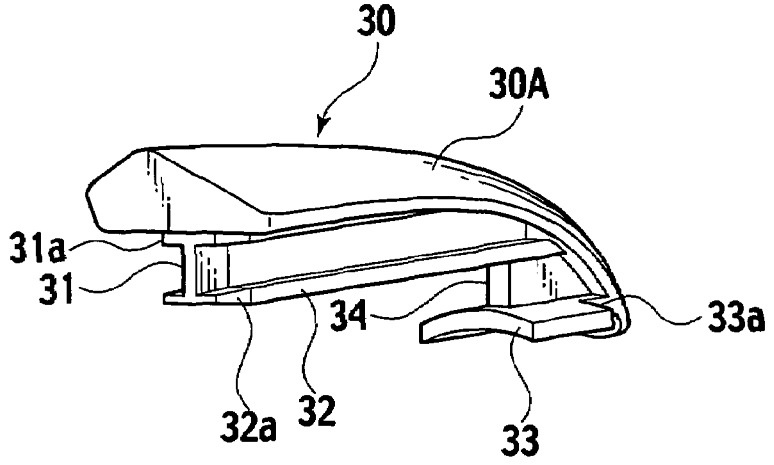
FIG. 3 is a perspective view of an operating member of the knob according to the embodiment of the present invention (a perspective view seen from III direction in FIG. 2)
Figure 4:
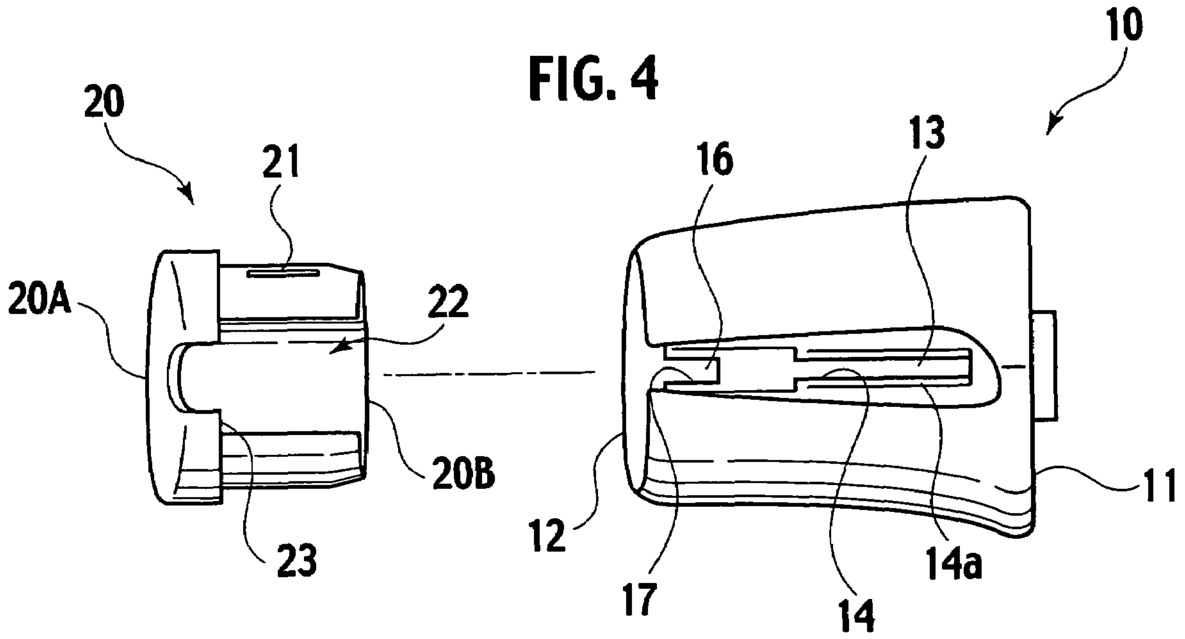
FIG. 4 is a top view of a knob body and a cap according to the embodiment of the present invention.
Figure 5:
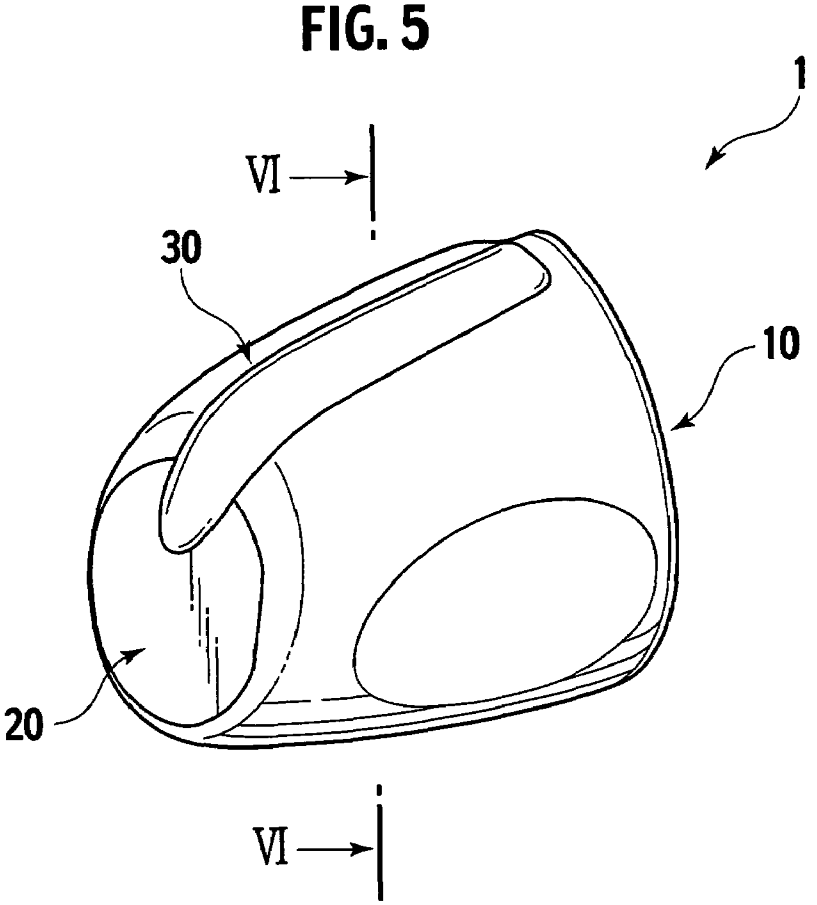
FIG. 5 is an assembled perspective view of the knob according to the embodiment of the present invention.
Figure 6:
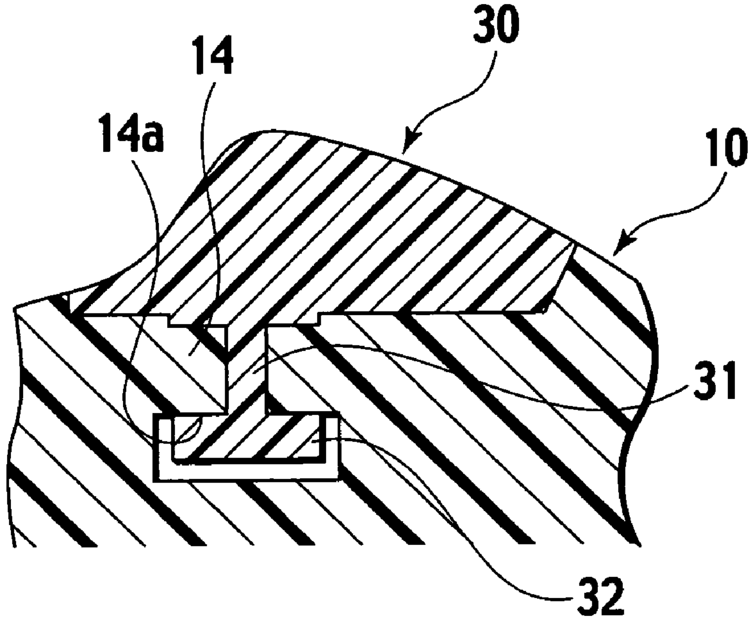
FIG. 6 is a partial sectional view of the knob according to the embodiment of the present invention (a sectional view taken along a line VI-VI in FIG. 5)

A joining stepped portion 31*a* for improving the fixation (fitting degree) of the guiding protrusions 14 with the inclined portion 14*a* is provided between the rib 31 and an operating member body 30A (see FIG. 3).

The operating member 30 includes the tab 33 that surface-contacts an inner wall 18 of the knob body 10 and the joining rib 34 that joins the flange 32 and the tab 33. The tab 33 and the joining rib 34 are shorter in axial length than the rib 31 and flange 32. Especially, the joining rib 34 is shorter in axial length than the tab 33.

In the knob 1 according to the embodiment described above, the knob body 10 has the guiding protrusions 14 that define the slit 13, and the operating member 30 includes the rib 31 that can be inserted into the slit 13 and the flange 32 that engages the guiding protrusions 14, as described above. As a result, chattering (vibration) occurs at the fitting portion of the knob body 10 and the operating member 30 can be prevented, so that cracking of the operating member 30 or peeling off of the metal plate film thereon can be prevented.

Figure 1B:
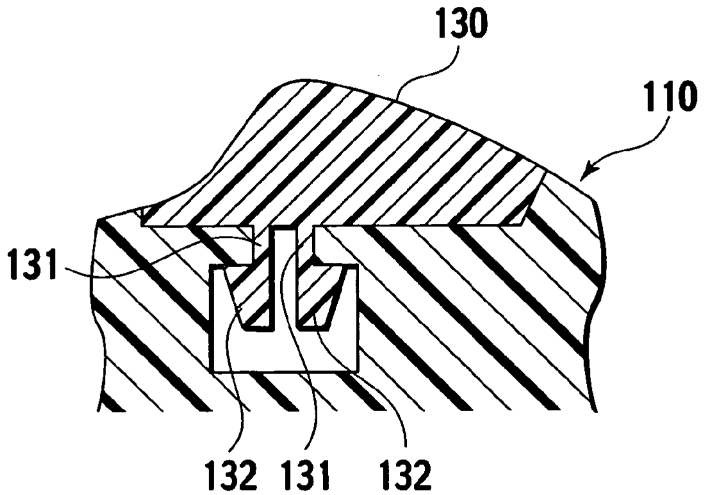
FIG. 1B RELATED ART
FIG. 1B is a partial sectional view of the conventional knob (a sectional view taken along a line I-I in FIG. 1A)
Figure 2:
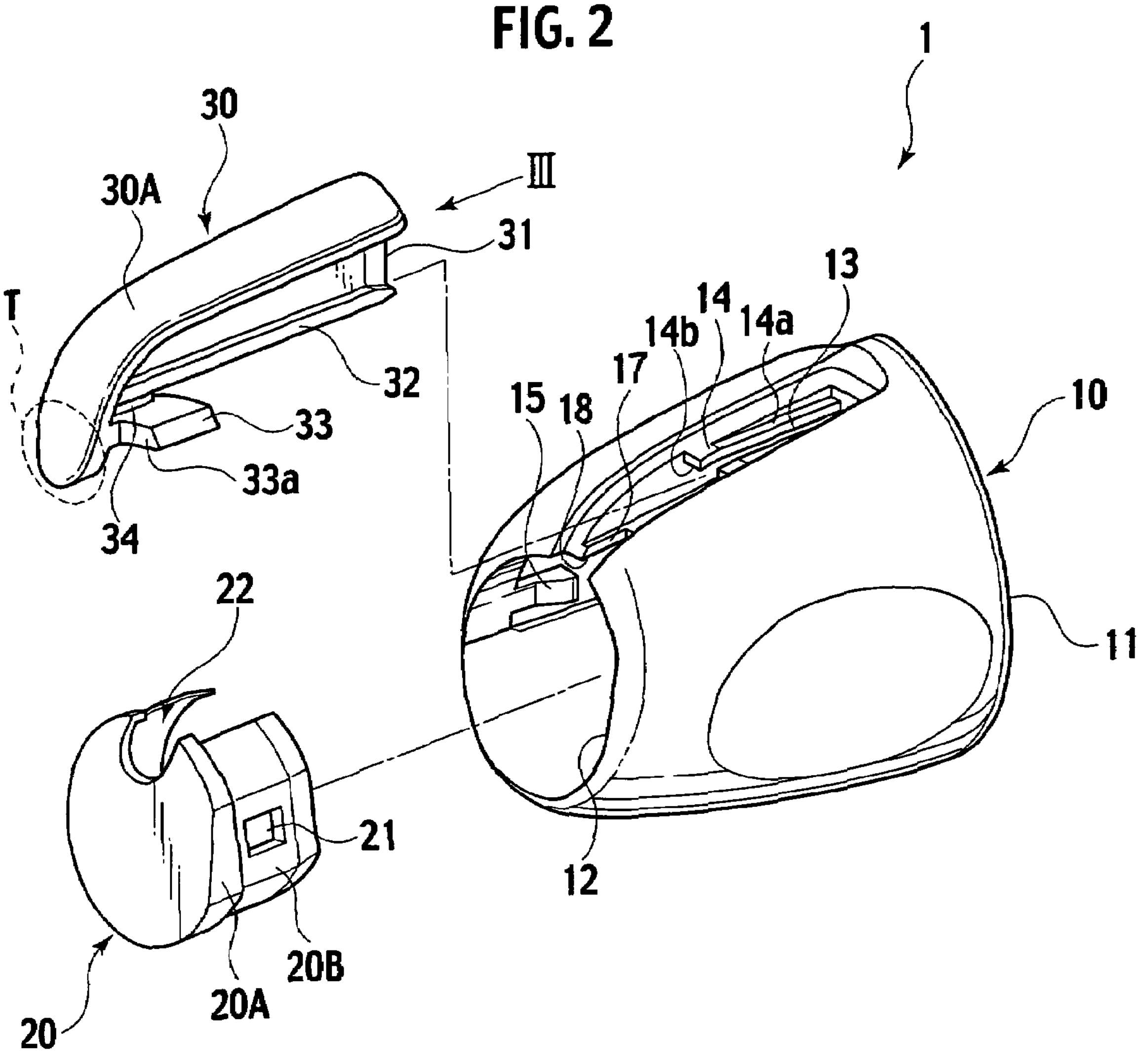
FIG. 2 is an exploded perspective view of a knob according to an embodiment of the present invention.

Specifically, in the knob 1 according to the embodiment, since the rib 31 provided to the operating member 30 possesses high rigidity as compared with a pair of the flexible snap tabs 131 of the conventional knob 100 (see FIG. 1A, FIG. 1B), cracking of the operating member 30 or peeling off of a plating film thereon can be prevented.

The knob body 10 has the barbed portions 15 that engage the cap 20, and the cap 20 has the through holes 21 that are engaged with the barbed portions 15 respectively. Therefore, by attaching the cap 20 to the knob body 10 after the operating member 30 is inserted into the knob body 10, the operating member 30 is held by the cap 20, so that the operating member 30 can be securely fixed.

The operating member 30 further includes the tab 33 and the joining rib 34, and the knob body 10 has the restricting protrusions 17 that define the short slit 16. Therefore, chattering (vibration) that occurs at the fitting portion of the knob body 10 and the operating member 30 when a rotating operation of the knob 1 is performed can be eliminated.

Further, the cap 20 has the stepped portion 23 that abuts on the end 33*a*. Therefore, due to abutting of the end 33*a* and the stepped portion 23 against each other, the operating member 30 can be securely fixed, so that chattering (vibration) of the operating member 30 can be securely eliminated.

Figure 7:
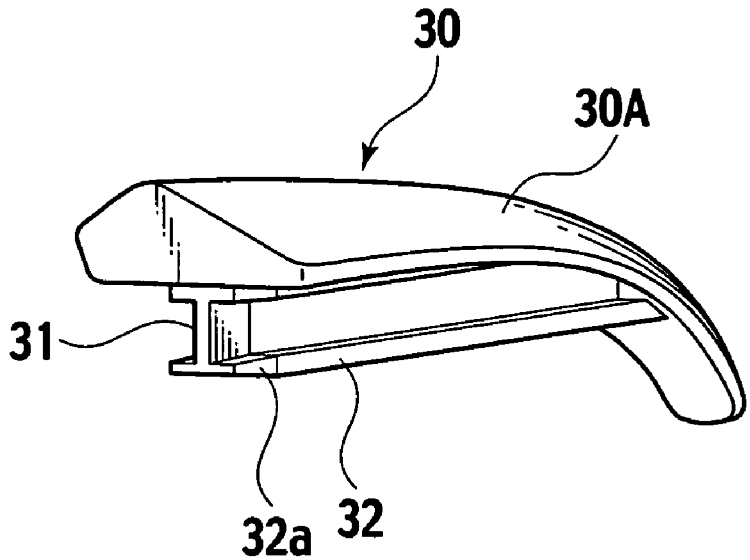
FIG. 7 is a perspective view of an operating member of a knob according to another embodiment of the present invention.

An operating member 30 of a knob according to another embodiment of the present invention is shown in FIG. 7. In this embodiment, like or identical parts of the above embodiment are designated with like reference numerals. While the operating member 30 according to the above embodiment includes the rib 31, the flange 32, the tab 33, and the joining rib 34, as shown in FIG. 7, the operating member 30 according to the present embodiment includes only the rib 31 and the flange 32. In this case, the knob body 10 does not have to include the restricting protrusions 17 that define the short slit 16.

The embodiments have been explained that the knob body 10 has the guiding protrusions 14 that define the slit 13, and the operating member 30 includes at least the rib 31 and the flange 32. However, the present invention is not limited thereto, and the knob body 10 can have a rib and a flange, and the operating member 30 can include guiding protrusions that define a slit.

What is claimed is:

1. A knob, comprising:

an approximately cylindrical knob body having a large opening and a small opening provided at both sides in an axial direction;

a cap attached to the small opening; and a metal-plated operating member attached to a side face of the knob body, wherein the knob body has a pair of guiding protrusions that define a slit in the axial direction therebetween, and a pair of restricting protrusions that define a short slit that is shorter in the axial length than the slit, the operating member includes a rib formed integrally therewith and inserted into the slit along the axial direction, a flange coupled to an edge of the rib approximately perpendicularly to the rib, the flange being fixed to the knob body due to restriction of an axial position of the operating member by the cap attached to the small opening, a tab that abuts on an inner wall of the knob body, and a joining rib that joins the flange and the tab, the flange is wider in width than the slit, and engaged by the guiding protrusions according to insertion of the rib into the slit at a time of insertion of the operating member into the knob body in the axial direction, and the joining rib and a portion defining an end of the short slit abut against each other to restrict the axial position of the operating member.

2. The knob according to claim 1, wherein the cap is attached to the knob body after insertion of the operating member into the knob body, so that the operating member inserted into the knob body is fixed due to the restriction by the cap.

3. The knob according to claim 2, wherein the knob body has a barbed portion that engages the cap, and the cap has a through hole that is engaged with the barbed portion.

4. The knob according to claim 1, wherein the cap further has a stepped portion that abuts on an end of the tab on the side of the cap, and the end of the tab on the side of the cap and the stepped portion abut against each other to fix the operating member.

* * * * *